United States Patent
Kato

(10) Patent No.: US 11,176,050 B2
(45) Date of Patent: Nov. 16, 2021

(54) INFORMATION PROCESSING DEVICE AND COMPUTER-READABLE RECORDING MEDIUM HAVING STORED THEREIN CACHE CONTROL PROGRAM

(71) Applicant: FUJITSU LIMITED, Kawasaki (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/030,428

(22) Filed: Sep. 24, 2020

(65) Prior Publication Data

US 2021/0133112 A1    May 6, 2021

(30) Foreign Application Priority Data

Nov. 5, 2019    (JP) .............................. JP2019-200773

(51) Int. Cl.
*G06F 3/06* (2006.01)
*G06F 12/0891* (2016.01)
*G06F 12/123* (2016.01)

(52) U.S. Cl.
CPC ........ *G06F 12/0891* (2013.01); *G06F 3/0641* (2013.01); *G06F 12/124* (2013.01); *G06F 2212/1044* (2013.01)

(58) Field of Classification Search
CPC .. G06F 12/0891; G06F 3/0641; G06F 12/124; G06F 2212/1044
See application file for complete search history.

(56) References Cited

U.S. PATENT DOCUMENTS

| | | | |
|---|---|---|---|
| 2015/0169665 A1 | 6/2015 | Sorenson, III | |
| 2017/0192892 A1* | 7/2017 | Pundir | G06F 12/0873 |
| 2017/0329721 A1* | 11/2017 | Kato | G06F 12/0891 |
| 2018/0150408 A1 | 5/2018 | Kato | |
| 2020/0210347 A1* | 7/2020 | Tian | G06F 9/5016 |
| 2020/0293447 A1* | 9/2020 | Gupta | G06F 12/0804 |

FOREIGN PATENT DOCUMENTS

| | | |
|---|---|---|
| JP | H10-049422 A | 2/1998 |
| JP | 2000-029765 A | 1/2000 |
| JP | 2014-511129 A | 5/2014 |
| JP | 2018-088020 A | 6/2018 |

\* cited by examiner

*Primary Examiner* — Sean D Rossiter
(74) *Attorney, Agent, or Firm* — Fujitsu Patent Center

(57) ABSTRACT

An information processing device includes: a cache memory; and a processor configured to: manage the number of times of reference to be used for deduplication control of a data block; store, among data blocks in the cache memory, a first management list in which the data block in which writing is requested and the number of times of reference is 1 is managed by a least recently used scheme, and, among the data blocks in the cache memory, a second management list in which the data block in which writing is requested and the number of times of reference is equal to or larger than 2 is managed by the LRU scheme; and in a case where a data block to be written is registered in the first management list when a write request is processed, maintain the data block registered in the first management list over the cache memory.

2 Claims, 9 Drawing Sheets

FIG. 4

| BELONGING TO R-SERIES | BELONGING TO D-SERIES | PAGE TYPE |
|---|---|---|
| R1 OR R2 | D1 OR D2 | Cross |
| GR1 OR GR2 | D1 OR D2 | Buffer |
| NONE | D1 OR D2 | Buffer |
| R1 OR R2 | GD1 OR GD2 | Clean |
| GR1 OR GR2 | GD1 OR GD2 | - |
| NONE | GD1 OR GD2 | - |
| R1 OR R2 | NONE | Clean |
| GR1 OR GR2 | NONE | - |
| NONE | NONE | - |

| HIT GHOST | HIT AREA | DECREASE | INCREASE |
|---|---|---|---|
| GR1 | Near | R2 | R1 |
| GR1 | Far | D1 OR D2 | R1 |
| GR2 | Near | R2 | R1 |
| GR2 | Far | D1 OR D2 | R2 |

INFORMATION PROCESSING DEVICE AND COMPUTER-READABLE RECORDING MEDIUM HAVING STORED THEREIN CACHE CONTROL PROGRAM

CROSS-REFERENCE TO RELATED APPLICATION

This application is based upon and claims the benefit of priority of the prior Japanese Patent Application No. 2019-200773, filed on Nov. 5, 2019, the entire contents of which are incorporated herein by reference.

FIELD

The embodiment discussed herein is related to an information processing device and a computer-readable recording medium having stored therein a cache control program.

BACKGROUND

In recent years, a content cache that manages content (data) as a key instead of a combination of a logical unit number (LUN) and a logical block addressing (LBA) has been known. In such a content cache, for example, a Secure Hash Algorithm (SHA)-1 value (hash value) is obtained for each content, and cache management is performed using these SHA-1 values as a key.

Japanese Laid-open Patent Publication No. 2018-88020, Japanese National Publication of International Patent Application No. 2014-511129, Japanese Laid-open Patent Publication No. 10-49422, Japanese Laid-open Patent Publication No. 2000-29765, and U.S. Patent Application Publication No. 2015/0169665 are examples of related art.

SUMMARY

According to an aspect of the embodiments, an information processing device includes: a cache memory; and a processor coupled to the cache memory and configured to: manage the number of times of reference to be used for deduplication control of a data block; store, among data blocks stored in the cache memory, a first management list in which the data block in which writing is requested and the number of times of reference is 1 is managed by a least recently used (LRU) scheme, and, among the data blocks stored in the cache memory, a second management list in which the data block in which writing is requested and the number of times of reference is equal to or larger than 2 is managed by the LRU scheme; and in a case where a data block to be written is registered in the first management list when a write request is processed, maintain the data block registered in the first management list over the cache memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of a page classification table;

FIG. 6 is a diagram illustrating an example of an increase/decrease table for an ideal length in a storage apparatus as an example of an embodiment;

DESCRIPTION OF EMBODIMENTS

Figure 1:
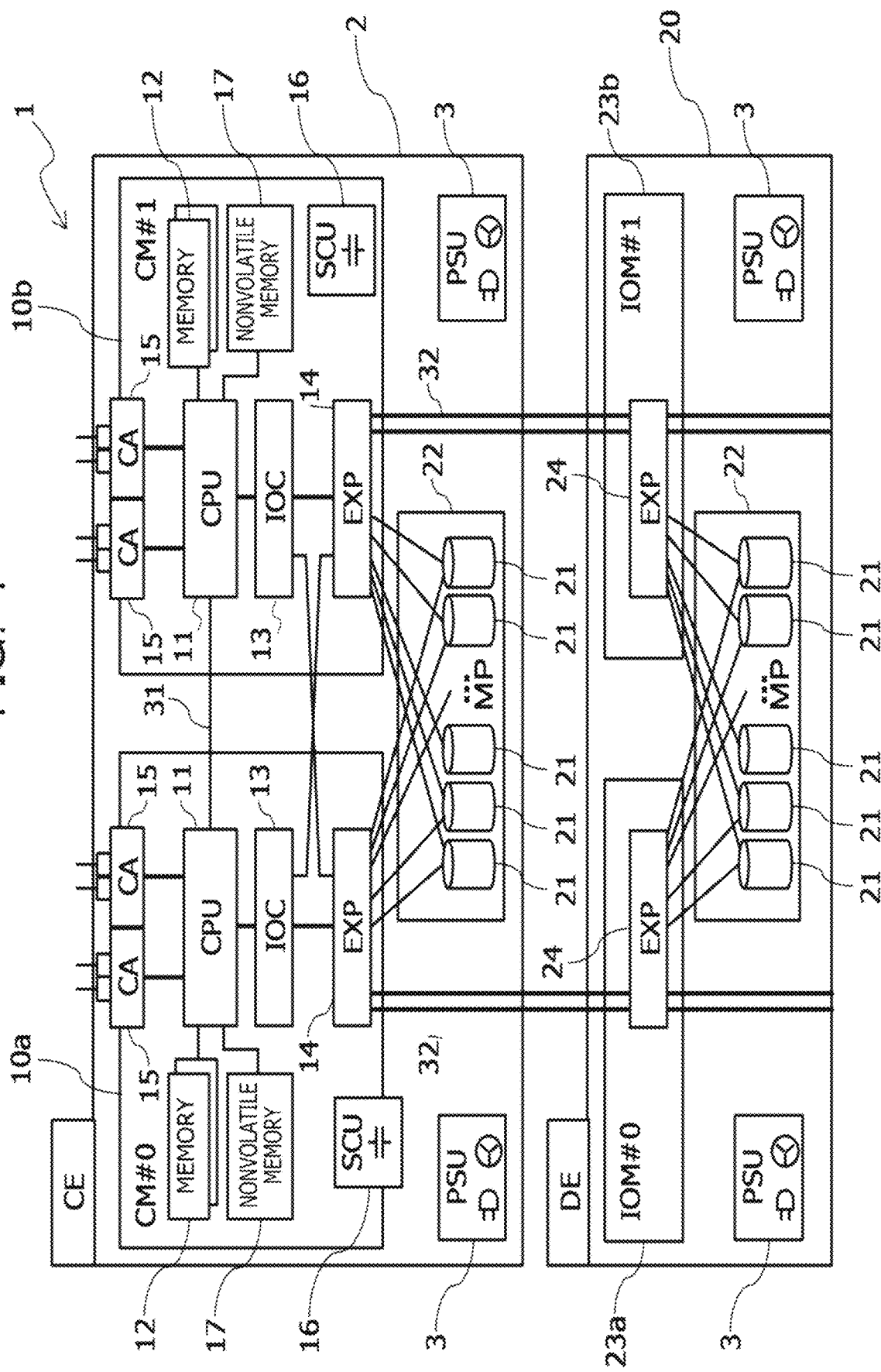
FIG. 1 is a diagram exemplifying a hardware configuration of a storage apparatus as an example of an embodiment.

In a cache memory, deduplication is performed in many cases, and contents having the same SHA-1 value are cached as one even when their LUNs and LBAs are different, thereby improving the capacity efficiency of the cache.

Each content is managed by a reference count, and at the time of writing, a reference count of a new content is incremented (+1) while a reference count of an old content is decremented (−1).

Destaging is performed to move a content having a reference count of 1 from the cache to the storage apparatus, while control is performed to leave a content having a reference count equal to or larger than 2 in the cache. When a reference count becomes 0, the content is deleted from the cache. The destage may be referred to as write-back.

An adaptive replacement cache (ARC) has been known as a data replacement algorithm for managing a cache area. In ARC, the cache area is divided into an area that is managed based on Recency and an area that is managed based on. Frequency. A size of each area is optimized based on a history of data evicted from each area.

The hierarchical-ARC (H-ARC) has also been known as an ARC-based technology. In H-ARC, the cache area is further divided into an area for dirty data and an area for clean data.

The cache for dirty data (hereinafter, referred to as a dirty cache in some cases) is used for the purpose of reducing destage processing, and it is possible to reduce the number of times of destaging by performing overwriting over the cache.

However, in a cache management method for a content cache of related art, for example, in updating an operating system (OS), antivirus software, or the like over a Virtual Desktop Infrastructure (VDI), writing may occur in bursts at the same time.

In the writing that is performed in updating such an OS or the like, the LUN and the LBA as a writing destination are different for each host, but the content is the same in many cases. Therefore, when writing is performed by updating the OS or the like, dirty contents having a reference count equal to or larger than 2 are successively generated.

On the other hand, in a case of editing a Word document, an Excel table, or the like which is often performed in office work, the reference count is 1 in many cases because contents are frequently overwritten and editing of contents rarely overlaps with each other. Word and Excel are registered trademarks.

Therefore, in the cache algorithm for the content cache in related art, the content for updating the OS or the like is left in the cache, and the content for the office work is destaged from the cache. As a result, for example, when destaging of the content to be processed occurs during the office work, destaging of the content is not efficiently performed in the content cache.

According to one aspect of the present embodiment, the occurrence of destaging in a content cache memory may be reduced.

Hereinafter, embodiments of an information processing device and a cache control program will be described with reference to the drawings. However, the embodiments to be described below are merely examples, and are not intended to exclude the application of various modifications and techniques not explicitly described in the embodiments. For example, the embodiments may be implemented in various forms (including a combination of the embodiments and each modification or the like) without departing from the spirit and scope of the embodiments. Each drawing is not intended to include only the constituent elements illustrated in the drawing, and may include other functions and the like.

(A) Configuration

FIG. 1 is a diagram exemplifying a hardware configuration of a storage apparatus 1 as an example of an embodiment.

The storage apparatus 1 as an example of the present embodiment is communicably coupled to one or more host apparatuses (not illustrated) through a communication line, and provides a storage area to the host apparatuses. The communication line is, for example, a local area network (LAN) cable.

The storage apparatus 1 provides the storage area to the host apparatus, and has a function of creating and managing one or more logical volumes (not illustrated). The storage apparatus 1 may provide a virtualized volume (not illustrated) to the host apparatus.

The storage apparatus 1 is equipped with a plurality of storage devices 21 to be described later, and distributes data to the plurality of storage devices 21 by using redundant arrays of inexpensive disks (RAID) to store the data in a redundant state. The storage apparatus 1 includes a controller enclosure (CE) 2. One or more device enclosures (DEs) 20 (one in the example illustrated in FIG. 1) are coupled to the CE 2.

The CE 2 includes one or more controller modules (CMs) 16a and 10b (two in the example illustrated in FIG. 1) and PSUs 3.

The power supply units (PSUs) 3 supply power to the CMs 10a and 10b, for example.

The CMs 10a and 10b are control devices (controllers, storage control devices) that control operations in the storage apparatus 1, and are information processing devices. The CMs 10a and 10b perform various types of control such as data access control to the storage devices 21 of the DE 20 in response to an I/O request transmitted from a host apparatus or the like.

The CMs 10a and 10b are duplicated, and one of the CMs 10 (for example, CM 10a) normally performs various types of control while serving as a primary CM, However, at failure of the primary CM 10a or the like, the CM 10b that serves as a secondary CM takes over the operation of the CM 10a as the primary CM. The CMs 10a and 10b have a redundant configuration (redundant path configuration).

The CMs 10a and 10b mutually have the same configuration. Hereinafter, when the CMs 10a and 10b are not particularly distinguished, they are referred to as the CMs 10. The CM 10a may be referred to as a CM #0, and the CM 10b may be referred to as a CM #1.

The CM #0 and the CM #1 are communicably coupled to each other via an internal bus 31. The internal bus 31 may perform communication conforming to, for example, the Peripheral Component Interconnect Express (PCIe) standard, or may perform communication conforming to another standard. The respective CMs 10 and DE 20 are communicably coupled to each other via, for example, bus lines (data access paths) 32.

As illustrated in FIG. 1, the DE 20 is a device housing in which the storage devices 21 and input output modules (IOM) 23 are mounted.

The DE 20 is communicably coupled to each of the two CMs #0 and #1 through the data access path, and includes two IOMs 23 and a plurality of storage devices 21.

The storage device 21 is a known device that stores data in a readable and writable manner, and is, for example, a hard disk drive (HDD) or a solid-state drive (SSD). These storage devices 21 have a similar functional configuration to each other. Some of the plurality of storage devices 21 included in the DE 20 may function as hot spares. The plurality of storage devices 21 is coupled through a mid plane (MP) 22.

The DE 20 includes two IOMs 23a and 23b. For example, the IOMs 23a and 23b are duplicated in the DE 20. Hereinafter, when the IOMs 23a and 23b are not particularly distinguished from each other, the IOMs 23a and 23b are referred to as IOMs 23. The TOM 23a may be represented as an TOM #0 and the TOM 23b may be represented as an TOM #1.

Each TOM 23 controls data access to the storage devices 21. The TOM 23a of the DE 20 is coupled to an EXP 14 of the CM 10a (CM #0) to be described later. The TOM 23b of the DE 20 is coupled to an EXP 14 of the CM 10b (CM #1). The IOMs 23 (DEs 20) of a plurality of DEs 20 may be cascade-coupled to each EXP 14 of the CMs 10a and 10b.

The CE 2 is also provided with a plurality of storage devices 21, and these storage devices 21 are coupled via the MP 22.

The CM 10 is a storage control device (information processing device) that performs various types of control, and performs various types of control in response to a storage access request (access control signal, hereinafter referred to as a host I/O) from the host apparatus. The storage access request includes a read request and a write request.

As illustrated in FIG. 1, the CM 10 includes a central processing unit (CPU) 11, a memory 12, an input output controller (IOC) 13, an expander (EXP) 14, a nonvolatile memory 17, a system capacitor unit (SCU) 16, and channel adapters (CAs) 15.

The CAs 15 are adapters that receive data transmitted from the host apparatus and the like and transmit data outputted from the CM 10 to the host apparatus or the like. For example, the CAs 15 control input and output of data to and from the host apparatus or the like.

The CAs 15 are, for example, network adapters that are communicably coupled to the host apparatus or the like via a network attached storage (NAS), and may be LAN interfaces or the like. The CAs 15 may be network adapters that are communicably coupled to the host apparatus or the like through a storage area network (SAN). For example, a CA 15 may be an Internet Small Computer System Interface (iSCSI) or a Fibre Channel (FC) interface.

The EXP 14 is an expansion interface for communicably coupling to the DE 20, and is configured as, for example, an integrated circuit (IC) chip. In the example illustrated in the figure, each CM 10 includes one EXP 14. The EXP 14 is coupled to an EXP 24 provided in the DE 20 through the communication line 32, and is coupled to the plurality of storage devices 21 provided in the CE 2. The EXP 14 functions as a switch that couples the CM 10 to the storage devices 21 provided in the DE 20 or the like.

The storage devices 21 are coupled to the EXPs 14, and each CM 10 performs access control of access to the storage devices 21 based on an I/O request received from the host apparatus.

Each CM 10 writes and reads data to and from the storage devices 21 via the EXP 14.

The nonvolatile memory 17 stores a program to be executed by the CPU 11 and data. The nonvolatile memory 17 stores, for example, a Basic Input/Output System (BIOS) and an operating system (OS). The software program over the nonvolatile memory 17 is appropriately read and executed by the CPU 11. The nonvolatile memory 17 also stores a cache control program to be described later.

The IOC 13 is a control device for controlling data transfer in the CM 10, and, for example, enables direct memory access (DMA) transfer which is executed to transfer data stored in the memory 12 without going through the CPU 11.

The SCU 16 is a backup power supply for avoiding loss of the contents in the memory during power failure, and includes, for example, a plurality of lithium-ion capacitors (LICs).

The memory 12 is, for example, a random-access memory (RAM), and is used as a main storage device. The memory 12 temporarily stores at least a part of an application program to be executed by the CPU 11. The memory 12 stores various data to be used for processing by the CPU 11. The application program may include a cache control program to be executed by the CPU 11 in order to implement a cache management function of the present embodiment by the CM 10.

A part of a storage area in the memory 12 is used as a cache (cache memory) for storing data to be written to the storage device 21 and data read from the storage device 21.

The CPU 11 is a processing device (processor) for executing various types of control and calculation, and the CPU 11 is, for example, a multi-core processor (multi-core CPU). The CPU 11 enables various functions by executing the OS and a program stored in the nonvolatile memory 17, the memory 12, and the like. For example, the CPU 11 executes a cache control program to enable functions as a host I/O processing unit 212, a cache control unit 213, and a disk I/O processing unit 214 which will be described later with reference to FIG. 2.

Figure 2:
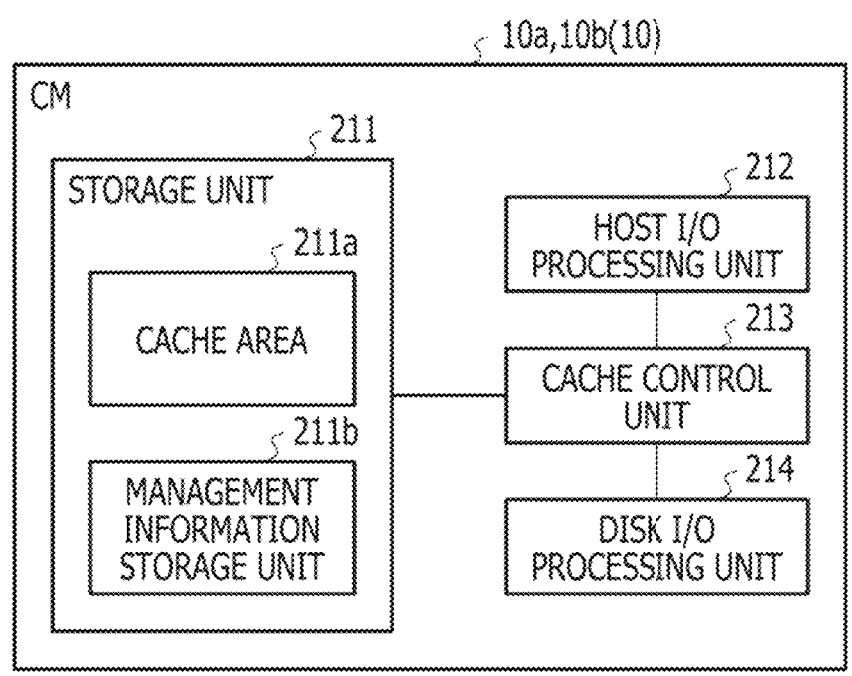
FIG. 2 is a diagram exemplifying a functional configuration of a controller module (CM) of a storage apparatus as an example of the embodiment.

FIG. 2 is a diagram exemplifying a functional configuration of the CM 10 of the storage apparatus 1 as an example of an embodiment.

The CM 10 functions as a storage unit 211, the host I/O processing unit 212, the cache control unit 213, and the disk I/O processing unit 214.

The storage unit 211 is implemented as a storage area secured in the memory 12. The storage unit 211 includes a cache area 211a and a management information storage unit 211b. The cache area 211a temporarily stores data of some logical blocks included in the logical volume. The cache area 211a is managed in units of pages, and data of one logical block is stored in one page. For example, in the following description, data of a logical block may be referred to as a "data block". The data block may have a fixed length. Hereinafter, the data block may be referred to as "content data". The management information storage unit 211b stores various types of management information to be used for storage control in the cache area 211a.

The host I/O processing unit 212, the cache control unit 213, and the disk I/O processing unit 214 are implemented as modules of the program (cache control program) to be executed by the CPU 11, for example.

The host I/O processing unit 212 receives an access request (a write request or a read request) from the host apparatus and requests the cache control unit 213 to perform processing corresponding to the access request. For example, when a write request is received, the host I/O processing unit 212 passes a write destination address and write data received together with the write request to the cache control unit 213, and requests the cache control unit 213 to perform a write process. On the other hand, when a read request is received, the host I/O processing unit 212 passes a read source address to the cache control unit 213, and requests the cache control unit 213 to perform a read process. The host I/O processing unit 212 receives read data from the cache control unit 213, and transmits the read data to the host apparatus.

The cache control unit 213 executes access processing requested from the host I/O processing unit 212 by using the cache area 211a. For example, the cache control unit 213 temporarily stores the data block read from the DE 20 in response to the read request, or the data block requested to be written, in the cache area 211a. When the data block requested to be accessed is present in the cache area 211a, the cache control unit 213 basically accesses the cache area 211a without accessing the DE 20 to execute the write process or the read process. The cache control unit 213 manages the read process and the write process of the cache area 211a so that a data block that has been accessed recently or a data block that has been accessed frequently is held in the cache area 211a, Hereinafter, the cache area 211a may be referred to as a cache memory.

The cache control unit 213 calculates a fingerprint (hash value) for each data block (content data). For example, the cache control unit 213 obtains a SHA-1 value by performing SHA-1 calculation based on the data block. The storage apparatus 1 uses the SHA-1 value as a fingerprint. For example, the cache control unit 213 may easily compare contents by obtaining a SHA-1 value of 20 bytes.

The cache control unit 213 performs deduplication management for a plurality of contents by using the SHA-1 value as a key. The cache control unit 213 provides a reference counter for each content stored in the cache area 211a, and, at the time of writing, increments a value of a reference counter of a new content by +1, and decrements a value of a reference counter of an old content by −1. The reference count corresponds to the number of times of reference to be used for controlling deduplication of data blocks.

The cache control unit 213 functions as a management unit that manages a fingerprint (SHA-1 value) of a data block (content data) and the number of times of reference (reference count), Hereinafter, a value of the reference counter may be referred to as a reference counter value or a reference count. The SHA-1 value and the reference count are stored in the management information storage unit 211b.

The disk I/O processing unit 214 accesses the DE 20 in response to a request from the cache control unit 213. For example, when the data block requested to be read does not exist in the cache area 211a, the disk I/O processing unit 214 reads the data block from the DE 20 in response to a request from the cache control unit 213. The disk I/O processing unit 214 writes dirty data existing in the cache area 211a into the DE 20 in response to a request from the cache control unit 213.

Next, a method of managing the cache area 211a by the cache control unit 213 will be described.

Figure 3:
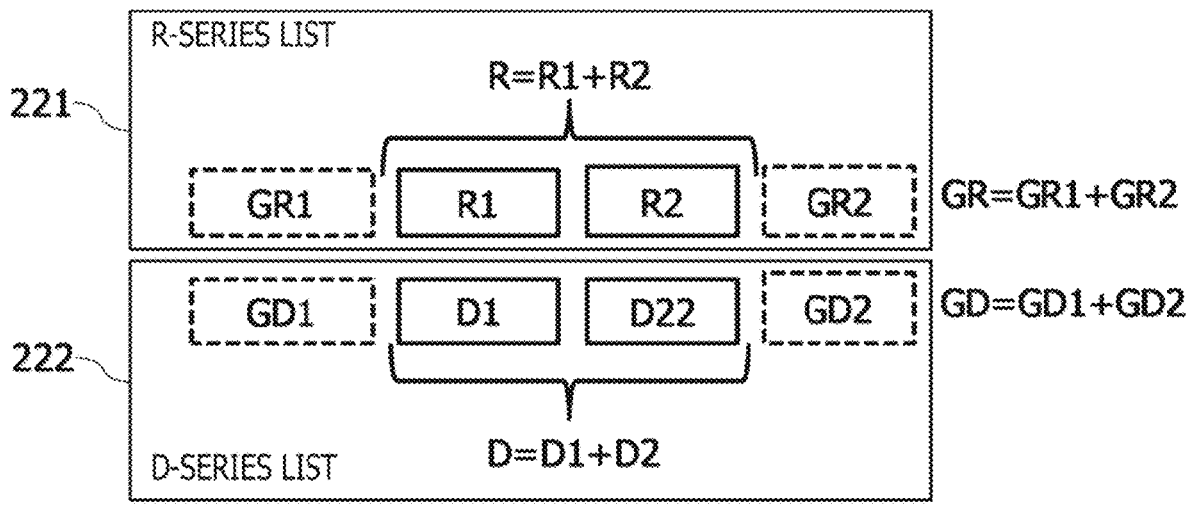
FIG. 3 is a diagram for explaining a cache management method in a storage apparatus as an example of an embodiment.

FIG. 3 is a diagram for explaining the cache management method in the storage apparatus 1 as an example of an embodiment, and illustrates an example of a list of entries.

In the storage apparatus 1, a list for managing data blocks that are considered to be likely to cause a read hit and a list for managing dirty data are provided as mutually independent lists. As a result, a read frequency does not affect determination of the easiness of overwriting, and it is possible to reliably reduce the number of times of write-back for a logical block that is easily overwritten.

As illustrated in FIG. 3, the storage apparatus 1 includes an R-series list 221 and a D-series list 222. The R-series list 221 is a list of entries corresponding to data blocks that are considered to be likely to cause a read hit. The D-series list 222 is a list of entries corresponding to dirty data.

An entry is data linked to metadata of a data block stored in the cache area 211a or metadata of a data block evicted from the cache area 211a.

The entries belonging to the R-series list 221 and the entries belonging to the D-series list 222 are independent of each other. Therefore, an entry linked to metadata of the same data block may exist not only in one of the R-series list 221 and the D-series list 222 but also in both of them. Hereinafter, an entry belonging to the R-series list 221 may be referred to as an "R-series entry", and an entry belonging to the D-series list 222 may be referred to as a "D-series entry".

The R-series list 221 includes lists R1, R2, GR1, and GR2. The D-series list 222 includes lists D1, D2, GD1, and GD2. The lists R1, R2, GR1, GR2, D1, D2, GD1, and GD2 are all managed by a least recently used (LRU) scheme.

The lists R1 and R2 are lists to which entries corresponding to data blocks stored in the cache area 211a mainly in response to read requests belong. When a read of a data block corresponding to an entry that does not exist in the R-series list 221 is requested, the entry corresponding to this data block is added to a head (a most recently used (MRU) side) of the list R1. When a read of a data block corresponding to an entry existing in the list R1 is requested, the entry is moved to a head (the MRU side) of the list R2. When a read of a data block corresponding to an entry existing in the list R2 is requested, the entry is also moved to a head of the list R2.

By such control, the list R1 is managed based on Recency, and the list R2 is managed based on Popularity (or Frequency). For example, in the list R1, an entry corresponding to a data block for which a read is requested once from a state in which the corresponding entry does not exist in the R-series list 221 is held. On the other hand, in the list R2, an entry corresponding to a data block for which a read is requested two or more times from a state in which the corresponding entry does not exist in the R-series list 221, for example, an entry corresponding to a data block that is hit one or more times in the lists R1 and R2, is held. Therefore, the list R2 holds an entry corresponding to a data block considered to be frequently read.

An entry evicted from the list R1 is added to the list GR1. An entry evicted from the list R2 is added to the list GR2.

When a read of a data block corresponding to an entry existing in one of the lists GR1 and GR2 is requested, the entry is moved to the head of the list R2.

The lists D1 and D2 are lists to which entries corresponding to data blocks whose reference counters are equal to or larger than 1 belong.

In the list D1, an entry corresponding to a data block (content data) having a reference counter of 1 is added by LRU. The list D1 corresponds to a first management list of a content having a reference count of 1.

In the list D2, an entry corresponding to a data block (content data) having a reference counter equal to or larger than 2 is added by LRU. The list D2 corresponds to a second management list of a content having a reference count equal to or larger than 2.

When a write for overwriting a data block corresponding to an entry existing in the list D1 is requested and a reference count of the data block becomes equal to or larger than 2, the entry is moved to a head (an MRU side) of the list D2.

When a reference counter of a data block corresponding to an entry existing in the list D2 is decremented by 1 and the reference count of the data block becomes 1, the entry is moved to the list D1.

When a reference count of a data block corresponding to an entry existing in the list D1 is decremented by 1 and the reference count of the corresponding data block becomes 0, the entry is deleted from the list D1.

An entry evicted from the list D1 is added to the list GD1. An entry evicted from the list D2 is added to the list GD2, When a write of a data block corresponding to an entry existing in one of the lists GD1 and GD2 is requested, the entry is moved to the head of the list D2.

In the storage apparatus 1, the number of times of destaging is reduced by leaving content data that has a reference count of 1 and that is likely to be overwritten in the cache memory (cache area 211a).

The data blocks corresponding to the entries belonging to the lists D1 and D2 are written back (destaged) to storage device state information 10721 at a predetermined timing such as when the data blocks are evicted from the lists D1 and D2 to the lists GD1 and GD2.

A case where a belonging state of an entry to the list is expressed by a type of cache page will be described. A size of a cache page is the same as a size of the logical block.

FIG. 4 is a diagram illustrating an example of a page classification table 601. The page classification table 601 includes items of R-series, D-series, and page type. The item of R-series indicates a list in the R-series list 221 to which an entry corresponding to a data block in a cache page belongs. The item of D-series indicates a list in the D-series list 222 to which an entry corresponding to a data block in a cache page belongs. The item of page type indicates a type of cache page.

The page classification table 601 is a table in which cache pages are classified according to a belonging state to the lists of an entry corresponding to a data block stored in a cache page in the cache area 211a. For example, a page type "Cross" is a state in which a corresponding entry belongs to one of the lists R1 and R2 and belongs to one of the lists D1 and D2. A page type "Buffer" is a state in which a corresponding entry belongs to one of the lists D1 and D2 but at least does not belong to either the list R1 or the list R2 in the R-series list 221. A page type "Clean" is a state in which a corresponding entry belongs to one of the lists R1 and R2, but at least does not belong to either the list D1 or the list D2 in the D-series list 222. A page type "-" indicates that an appropriate cache page does not exist because a data block is not stored in the cache page.

(a) Read Process

The cache control unit 213 performs the following processing for the read process.

(a-1) A Case of Cross or Clean Page

A page whose page type is Cross or Clean is moved to MRU of R2.

When the page type is "Cross", the page belongs to D1 or D2, but nothing is performed for the D-series. For example, the cache control unit 213 does not intentionally perform update processing of the D-series list 222 such as moving the content to a head of MRU. In this way, the D-series remains unchanged during the read process.

(a-2) A Case of Buffer Page (a-2-1) A Case of Belonging to GR1 or GR2

When a page type is Buffer and belongs to GR1 or GR2, the ghost cache hit process for the R-series is performed and the page is moved to MRU of R2.

(a-2-2) A Case of Not Belonging to Either GR1 or GR2

When the page type is Buffer and does not belong to either GR1 or GR2, the page is moved to MRU of R1.

(a-3) A Case Other Than the Above

For example, this is a case where a page type does not correspond to any of Cross, Clean, and Buffer such as a case of a cache miss in which there is no page over the cache.

(a-3-1) A Case of Belonging to GR1 or GR2

The ghost cache hit process for the R-series is performed and the staged page is moved to MRU of R2.

(a-3-2) A Case of Not Belonging to Either GR1 or GR2

The staged page is moved to MRU of R1.

(b) Write Process (R-Series)

The cache control unit 213 performs processing of the R-series at the time of writing as follows.

(b-1) A Case of Cross or Clean Page

A page whose page type is Cross or Clean is moved to MRU of R2.

(b-2) A Case of Buffer Page (b-2-1) A Case of Belonging to GR1 or GR2

When a page type is Buffer and belongs to GR1 or GR2, the ghost cache hit process for the R-series is performed and the page is moved to MRU of R2.

(b-2-2) A Case of Not Belonging to Either GR1 or GR2

When the page type is Buffer and does not belong to either GR1 or GR2, the page is moved to MRU of R1.

(b-3) A Case Other Than the Above

For example, this is a case where a page type does not correspond to any of Cross, Clean, and Buffer such as a case of a cache miss in which there is no page over the cache.

(b-3-1) A Case of Belonging to GR1 or GR2

The ghost cache hit process for the R-series is performed, and the new page is moved to MRU of R2.

(b-3-2) A Case of Not Belonging to Either GR1 or GR2

The new page is moved to MRU of R1.

In the storage apparatus 1, since the cache area 211a is a content cache, when a reference count is 0, the page is deleted from the cache.

(c) Ghost Cache Processing of R-Series

In the storage apparatus 1, regarding the R-series, ghost lists, for example, each of the lists GR1 and GR2 is divided into a Far area and a Near area. When a ghost hit occurs, the cache control unit 213 adjusts ideal lengths depending on which ghost list is hit and which entry of the Far area and the Near area is hit.

Figure 5:
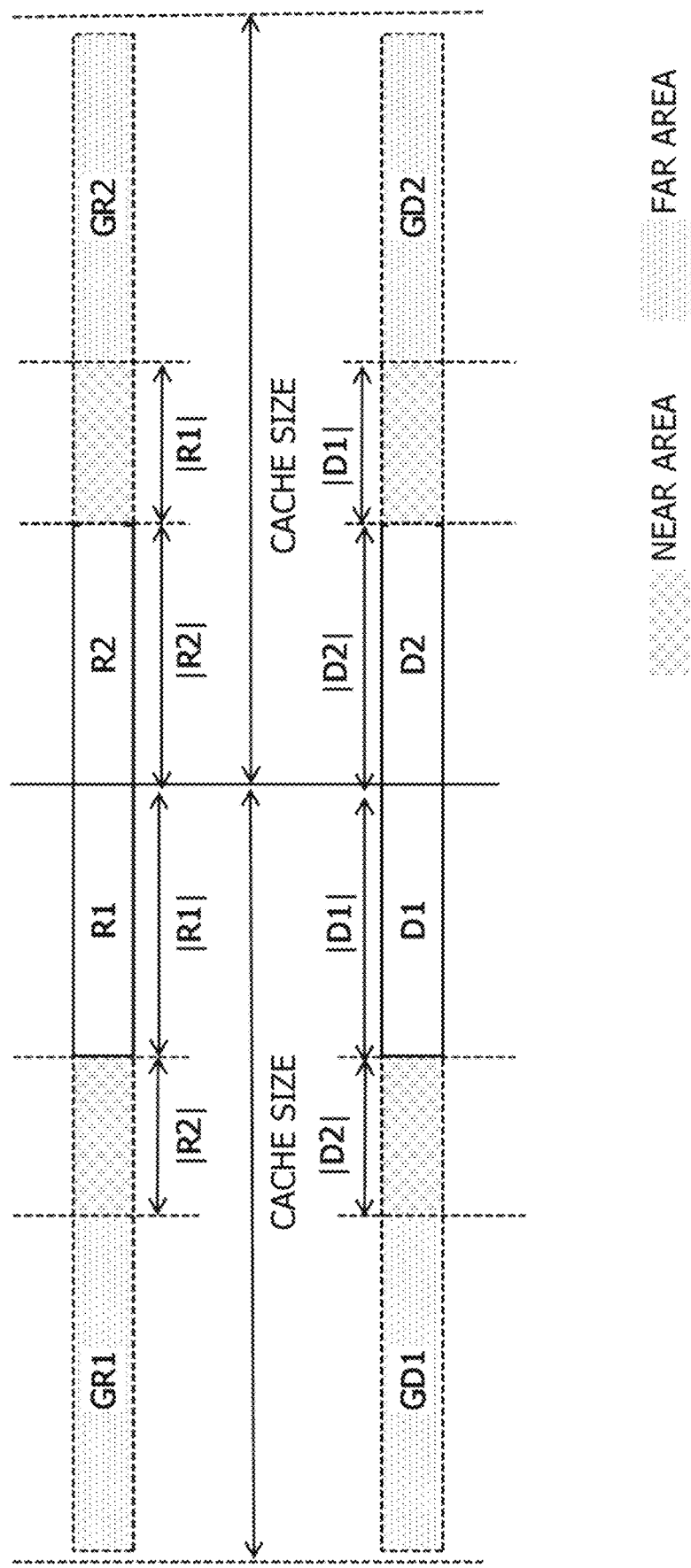
FIG. 5 is a diagram illustrating a configuration of a ghost cache in a storage apparatus as an example of an embodiment.

FIG. 5 is a diagram illustrating a configuration of a ghost cache in the storage apparatus 1 as an example of an embodiment.

In FIG. 5, it is assumed that a head (an MRU side) of each of the lists R1, GR1, D1, and GD1 is on the right side in FIG. 5. It is also assumed that a head side (an MRU side) of each of the lists R2, GR2, D2, and GD2 is on the left side in FIG. 5. |R1|, |R2|, |GR1|, |GR2|, |D1|, |D2|, |GD1|, and |GD2| indicate the current list lengths of the lists R1, R2, GR1, GR2, D, D2, GD1, and GD2, respectively.

As illustrated in FIG. 5, an area having the length |R2| on the head side in the list GR1 is set as a Near area, and an area having the length |R1| on the head side in the list GR2 is set as a Near area. It is assumed that a total size of the lists R1 and R2 is a cache size (a size of the cache area 211a) at the maximum. In this case, both of the total size of the lists R1 and GR1 and a total size of the lists R2 and GR2 are the cache size at the maximum.

An area of the length |D2| on the head side in the list GD1 is set as a Near area, and an area of the length |D1| on the head side in the list GD2 is set as a Near area. It is assumed that a total size of the lists D1 and D2 is the cache size at the maximum. In this case, both of a total size of the lists D1 and GD1 and a total size of the lists D2 and GD2 are the cache size at the maximum.

A list length adjustment method of the R-series will be described below. As an example, a list length adjustment method when a ghost hit occurs in the list GR1 will be described.

A ghost hit in the list GR1 means that the list length of the adjacent list R1 has to be increased. However, an entry in the Near area of the list. GR1 has a shorter time after being evicted from the list R1 than an entry in the Far area. Therefore, when the list R1 is a little larger, it is considered that the entry hit in the Near area may be moved to the list R2 before being evicted from the list R1. Therefore, it is considered that the necessity of largely enlarging the list length of the list R1 is lower in a case of hitting in the Near area than in a case of hitting in the Far area.

From such a point of view, when a hit occurs in the Near area of the list GR1, it may be considered that the necessity of increasing the size of the entire cache list, for example, the total size of the lists R1 and R2 is low. Therefore, when a hit occurs in the Near area of the list GR1, the cache control unit 213 increases an ideal length of the list R1 and decreases an ideal length of the list R2 without changing the total value of the respective ideal lengths of the lists R1 and R2.

On the other hand, when a hit occurs in the Far area of the list GR1, it may be considered that the necessity of increasing the size of the entire cache list, for example, the total size of the lists R1 and R2 is high. Therefore, the cache control unit 213 increases the ideal length of the list R1 and decreases an ideal length of one of the lists D1 and D2.

It is assumed that the ideal lengths of the lists D1 and D2 are Ld1 and Ld2, respectively. For example, the cache control unit 213 reduces the ideal length Ld1 of the list D1 when (Ld1−|D1|) is equal to or larger than (Ld2−|D2|). When (Ld1−|D1|) is smaller than (Ld2−|D2|), the cache control unit 213 decreases the ideal length Ld2 of the list D2.

When an entry in the list GR1 is hit as described above, this entry is added to the list R2. At this time, the cache control unit 213 evicts a terminal (LRU side) entry from one of the cache lists. For example, the cache control unit 213 evicts a terminal entry from one of the lists R1 and R2. At this time, the cache control unit 213 determines from which of the lists R1 and R2 the terminal entry is to be evicted so that the lengths of the lists R1 and R2 approach the ideal lengths of the adjusted lists R1 and R2, respectively.

The ideal length adjustment method when a ghost hit occurs in the list GR1 has been described above, but when a ghost hit occurs in another list, the ideal lengths may be adjusted according to an ideal length increase/decrease table 242 illustrated in FIG. 6.

FIG. 6 is a diagram illustrating an example of the ideal length increase/decrease table 242 in the storage apparatus 1 as an example of an embodiment. The ideal length increase/decrease table 242 illustrated in FIG. 6 may be stored in, for example, the management information storage unit 211b and may be referred to by the cache control unit 213 when the ideal lengths are adjusted.

The ideal length increase/decrease table 242 is used for ghost cache processing of the R-series, and includes items of a ghost list, a hit area, a decrease in ideal length, and an increase in ideal length. The item of the ghost list indicates a list name of the hit ghost list. The item of the hit area indicates which of the Near area and the Far area of the ghost list is hit. The item of the decrease in ideal length indicates a list name of the cache list whose ideal length is decreased. The item of the increase in ideal length indicates a list name of the cache list whose ideal length is increased.

For example, the ideal length increase/decrease table 242 indicates the ghost list "GR2", the hit area "Far area", the decrease in ideal length "D1 or D2", and the increase in ideal length "R2". This indicates that when a ghost hit occurs in the Near area of the list GR2, the cache control unit 213 decreases the ideal length of the list D1 or the list D2 and increases the ideal length of the list R2.

As described above, the cache control unit 213 adjusts the ideal length of each list depending on whether the ghost hit occurs in the Near area or the Far area. The cache control unit 213 determines an entry to be evicted from the lists R1 and R2 so that the respective list lengths of the lists R1 and R2 approach the corresponding ideal lengths. Thus, the respective list lengths of the lists R1 and R2 are appropriately adjusted.

For example, when it is considered that the number of data blocks that are requested to be read is large, the size of the cache list of R-series is expanded, and when it is considered that the number of data blocks that are frequently read is large, the size of the list R2 is expanded. This may increase a probability of the read hit. When it is considered that the number of data blocks that are requested to be written is large, the size of the cache list of the D-series may be expanded, and when it is considered that the number of data blocks that are frequently overwritten is large, the size of the list D2 may be expanded. This may reduce the number of times of write-back for data blocks that are frequently overwritten.

(d) Write Process (D-series)

Next, the outline of processing of the D-series at the time of writing will be described. The processing of the D-series at the time of writing includes writing of new content data. In the write process, a reference count of new content is incremented by 1 and a reference count of old content data is decremented by 1. The content data whose reference count becomes 0 (old content data) is deleted from the cache.

Hereinafter, Recency of a page type is represented by r1 and r2.

Figure 7:
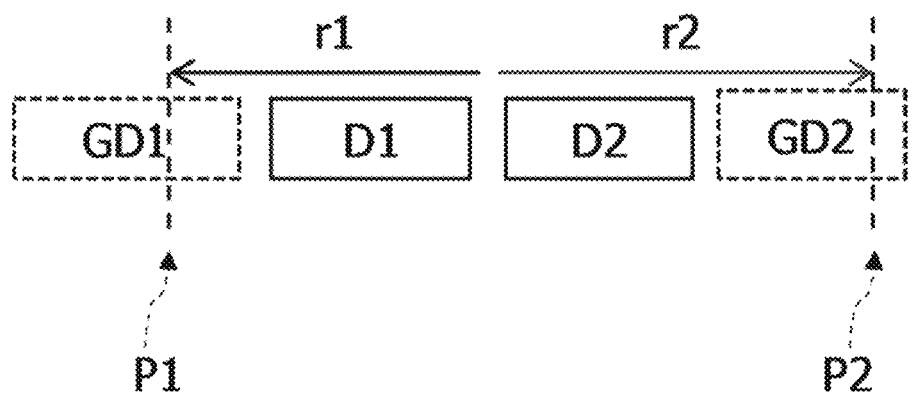
FIG. 7 is a diagram for explaining Recency of a page type in a storage apparatus as an example of an embodiment.

FIG. 7 is a diagram for explaining Recency of a page type in the storage apparatus 1 as an example of an embodiment.

When Recency of a page is r1, Recency of the page indicates that the corresponding page exists at the r1-th position in a case of counting from the head of the list D1 with GD1 being included. Similarly, when Recency of a page is r2, Recency of the page indicates that the corresponding page exists at the r2-th position in a case of counting from the head of the list D2 with GD1 being included. In FIG. 6, a position of a broken line P1 indicates r1, and a position of a broken line P2 indicates r2.

A period in which a reference count is 1 is represented by a symbol d1 (Duration d1), and a period in which a reference count is equal to or larger than 2 is represented by a symbol d2 (Duration d2).

d1 is a period during which the reference count changes from 1 to 0 or a period during which the reference count changes from 1 to 2.

d2 includes a period during which the reference count changes from 2 to a value equal to or larger than 2, a period during which the reference count is equal to or larger than 2, and a period during which the reference count changes from a value equal to or larger than 2 to 1.

d1 and d2 are obtained from Recency at the timing when the reference count becomes 0, 1, or 2.

The reference count changes at any time. For example, when the reference count changes as 1, 2, 1, 2, 1, 0, Duration changes as d1, d2, d1, d2, . . . , d1. When the reference count that changes in this manner is expressed in time-series order, the reference count may be expressed as $d_{1,k}, d_{2,k}$, in a case of $k \in N$ In a case of $Hd = \max d_{1,k}$, and $Hd2 = \max d_{2,k}$ Destage is reduced when the following conditional expression (1) is satisfied.

$$|D1| \geq Hd1 \wedge |D2| \geq Hd2 \tag{1}$$

In the conditional expression (1) described above, |D1| corresponds to the cache size of the list D1 and represents, for example, the number of pages. |D2| corresponds to the cache size of the list D2 and represents, for example, the number of pages.

Hd1 represents the number of movements of cache pages corresponding to the list D1, and Hd2 represents the number of movements of cache pages corresponding to the list D2. In the conditional expression (1), "|D1|≥Hd1" means that the content data is over the cache related to the list D1. "|D2|≥Hd2" means that the content data is over the cache related to the list D2.

When overwriting of content occurs in a state in which the content is over the cache, an old content is deleted and destaging is reduced. Under conditions other than the conditional expression (1), destaging occurs.

Since $|D1| \geq Hd1$ is $\forall k, |D1| \geq d_{1,k}$, for example, the conditional expression (1) defines that all cache hits occur in D1 or D2.

Since Hd1 and Hd2 are used for ghost cache hit process, the cache control unit 213 updates Hd1 and Hd2 by Hd1=max {d1, Hd2} and Hd2=max{d2, Hd2} every time the reference count becomes 0, 1, or 2.

(e) Writing of New Content in Write Process

Next, writing of new content in the processing of the D-series at the time of writing of content in the storage apparatus 1 will be described for each of cases (1) to (4) from the viewpoint of a target cache. In any of (1) to (4), addition (+1) or subtraction (−1) of a reference count is performed.

From the viewpoint of the cache, a case where a target content is in any of the lists D1, D2, GD1, and GD2, and a case where a target content is not in the cache will be separately described.

(1) A Case of Being in List D1

The cache control unit 213 moves the target content to MRU of D2 without updating Hd1. At this time, since |D|≥Hd1 is satisfied, Hd1 does not have to be updated.

(2) A Case of Being in List D2

Only the reference count is updated, and nothing is performed on the list D2 in particular. For example, the cache control unit 213 does not intentionally perform update processing of the list 02 such as moving the content to a head of MRU. When a data block to be written is registered in the list D2 (a reference counter is equal to or larger than 2) at the time of processing a write request, the cache control unit 213 suppresses changing the list D2 for the processing of the write request in terms of the data block registered in the list D2.

This makes it easy to destage the content over the list D2. For example, the cache control unit 213 performs control to preferentially destage a content having a reference count equal to or larger than 2. Accordingly, a content over the list D1 is likely to remain over the cache. For example, the cache control unit 213 performs control to leave a content having a reference count of 1 over the cache as much as possible.

(3) A Case of Being in Lists GD1 and GD2

When an original reference count is equal to or larger than 2, Hd1 and Hd2 are not updated. For example, when the target content is in the list GD1, the cache control unit 213 does not update the value of Hd1. When the target content is in the list GD2, the cache control unit 213 does not update the value of Hd2. When the reference count is 1, Hd1 is updated.

(4) A Case of Not Being over List

When the target content is not in the cache, it is considered that there are two cases: a case where the content is stored in the storage drive and a case where the content is not stored in the storage drive.

(4-1) A Case of Being Over Storage Drive

Since the content has been written to the storage drive, only the reference count is updated, and no update processing is performed in terms of the cache.

(4-2) A Case of Not Being over Storage Drive

Since this corresponds to the first writing of the content, the page is moved to MRU of D1 with Hd1=Hd2=0 set.

(f) Deletion of Old Content in Write Process

Next, the deletion of an old content in the processing of the D-series at the time of writing a content in the storage apparatus 1 will be described for each of cases (1) to (4) from the viewpoint of a target cache. In any of the following (1) to (4), addition (+1) or subtraction (−1) of a reference count is performed.

Hereinafter, similarly to the writing of a new content, a case where a target content is in any of the lists D1, D2, GD1, and GD2, and a case where a target content is not in the cache will be separately described from the viewpoint of the cache.

(1) A Case of Being in List D1

When the content is over the list D1, since the conditional expression (1) has already been satisfied, the cache control unit 213 deletes the content from the cache without updating Hd1.

(2) A Case of Being in List D2

When an original reference count is larger than 2, change processing of the list D2 is not performed. For example, the cache control unit 213 does not perform update processing of the list D2 such as moving the content to a head of MRU. When the reference count is 2, the content is moved to MRU of D1 without updating Hd2. At this time, since $|D2| \geq Hd2$ is satisfied, Hd2 does not have to be updated.

(3) A Case of Being in Lists GD1 and GD2

When an original reference count is larger than 2, nothing is performed. For example, the cache control unit 213 does not update Hd1 and Hd2. When the target content is in the list GD1, the cache control unit 213 does not update the value of Hd1. When the target content is in the list GD2, the cache control unit 213 does not update the value of Hd2. When the original reference count is 2, Hd2 is updated. When the original reference count is 1, Hd1 is updated. For example, the reference count is updated from 0 to 1. Ghost cache hit process for the D-series is performed to delete a ghost page.

(4) A Case of Not Being over List

Nothing is performed as the content cache.

When the content is not stored in the storage drive, it is determined that the reference counter has a bug, and therefore it is desirable to output an alert or the like.

(g) Ghost Cache Processing

Next, ghost cache processing in the storage apparatus 1 as an example of an embodiment will be described.

As described above with reference to FIG. 5 and FIG. 6, the Near area and the Far area are used for ghost cache processing of the R-series.

For example, when a cache hit occurs in the Near area, an ideal length (Lr2) of the list R2 is decreased, and an ideal length (Lr1) of the list R1 is increased. On the other hand, when a cache hit occurs in the Far area, an ideal length (Ld1) of the list D1, or an ideal length (Ld2) of the list. D2 is decreased, and the ideal length (Lr1 or Lr2) of the list R1 or the list R2 is increased.

On the other hand, Hd1 and Hd2 are used for ghost cache processing of the D-series. As described above, in the storage apparatus 1, in writing a new content in the write process, when the target content is in the list D2, the content is intentionally not moved to MRU. As a result, it is impossible to manage the cache of the D-series based on Recency. Therefore, in the storage apparatus 1, the cache control unit 213 performs ghost cache processing of the D-series by using Hd1 and Hd2.

In a case of a ghost cache hit, $|D1|<Hd1 \vee |D2|<Hd2$ is satisfied. When a ghost cache hit occurs in GD1 or GD2, the content is entered at least in the ghost cache, so that $|D1|<Hd1$ (when a cache hit occurs in GD1) or $|D2|<Hd2$ (when a cache hit occurs in GD2) is satisfied.

The cache control unit 213 classifies ghost cache processing according to the other determination result of $|D2|<Hd2$ (or $|D1|<Hd1$).

For example, the case where the ghost cache occurs in the GD1 will be described.

In the case of $|D2|<Hd2$ (for example, $|D1|<Hd1 \wedge |D2|<Hd2$), since both D1 and D2 are insufficient in size, the cache control unit 213 decreases the ideal length (Lr1) of the list R1 or the ideal length (Lr2) of the list R2, and increases the ideal length (Ld1) of the list D1.

On the other hand, in the case of $|D2| \geq Hd2$, since D2 is sufficient in size but D1 is insufficient in size, the cache control unit 213 decreases the ideal length (Ld2) of the list D2, and increases the ideal length (Ld1) of the list D1.

Destaging is performed at a timing when the cache size is reduced.

(B) Operation

A method of using the content cache in the storage apparatus 1 as the example of the embodiment configured as described above will be described with reference to FIG. 8 and FIG. 9.

Figure 8:
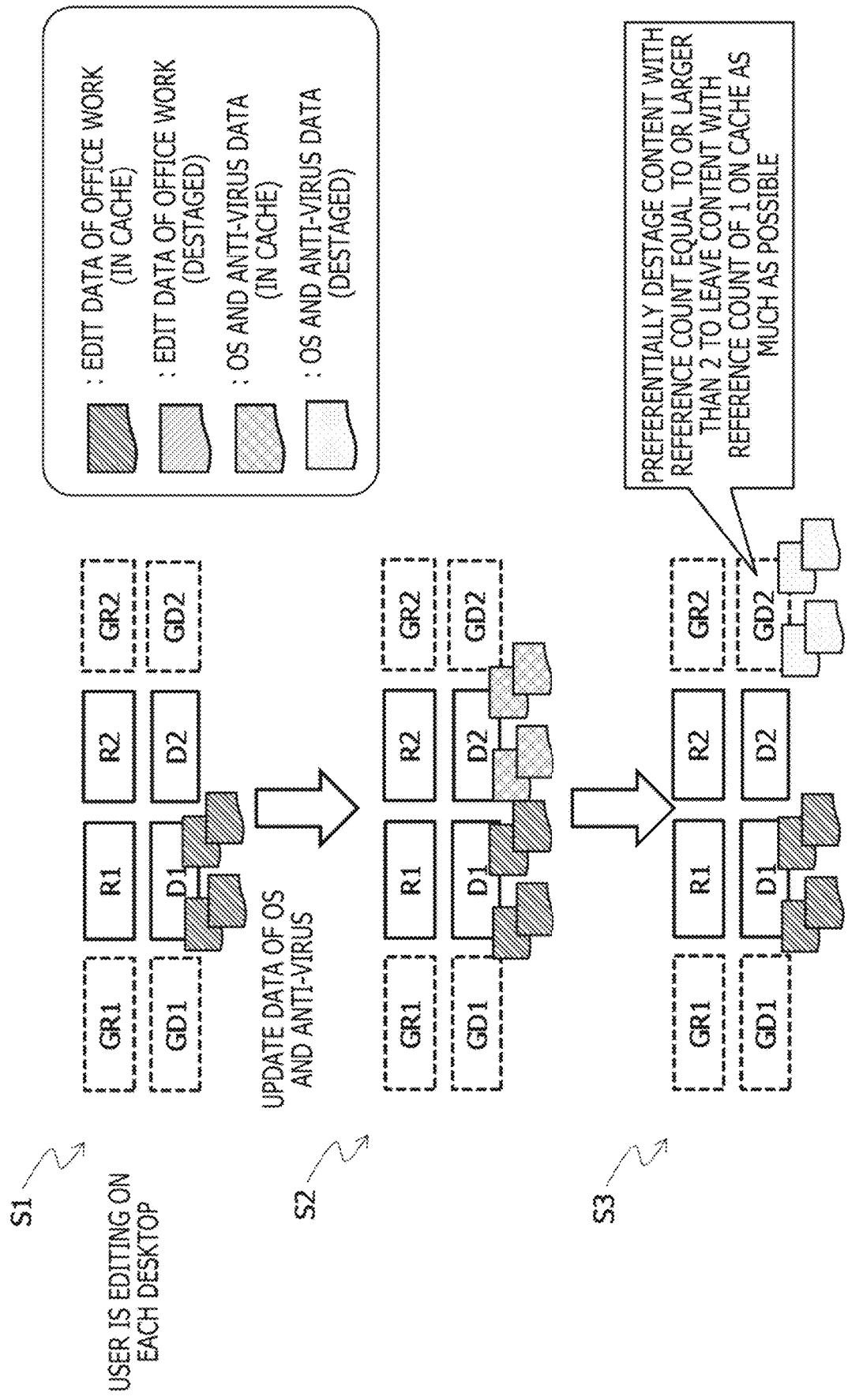
FIG. 8 is a diagram for explaining a method of using a content cache in a storage apparatus as an example of an embodiment.

FIG. 8 illustrates an example in which an OS and antivirus software are updated during office work (data editing work) over a VDI.

In a state illustrated in step S1, edit data associated with office work is registered in the list D1 (in the cache).

In such a state, when the OS or the antivirus software is updated, a write accompanying the update processing occurs in a burst manner. Accordingly, update data to be written is registered in the list D2 of the content cache (step S2).

When a write to content data over the list D2 occurs, the cache control unit 213 only updates the reference counter, and does not perform processing such as moving the content to a head of MRU. As a result, the content data is shifted from the list D2 to the list GD2 in accompany with the update operation of the OS or the like to be subsequently performed (step S3). Thereafter, the content data over the list GD2 is evicted from the cache and destaged. As described above, in the storage apparatus 1, the content over the list D2 is easily destaged.

Since the content data over the list D2 is easily destaged, the content data over the list D1 easily remains over the cache. For example, in the list D1, edit data of the office work is maintained. Due to the office work performed by a user, the content data over the list D1 is overwritten and updated, thereby reducing a frequency of destaging a content having a reference count of 1.

Figure 9:
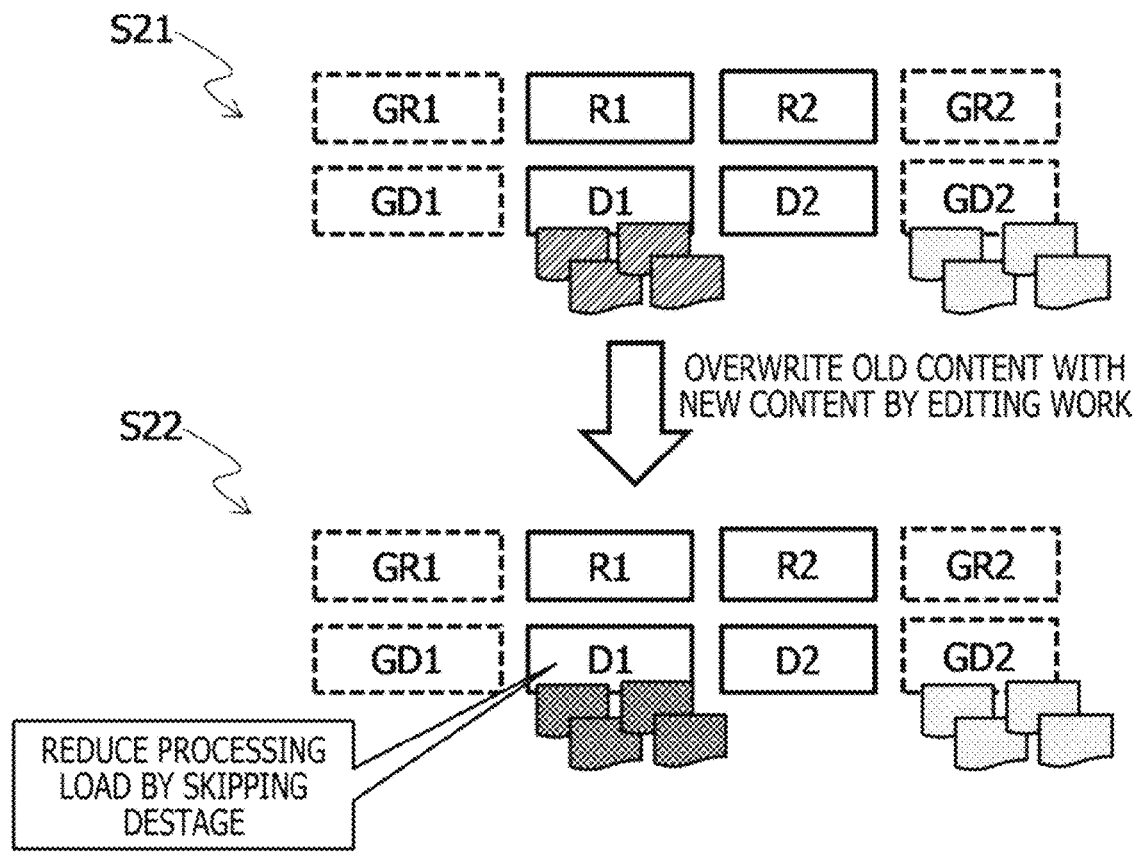
FIG. 9 is a diagram for explaining the method of using a content cache in a storage apparatus as an example of an embodiment.

FIG. 9 illustrates an example in which the office work (data editing work) is continuously performed over the VDI after the state illustrated in FIG. 8.

When the user performs editing work from a state of step S21, the edit data (in the cache) of the old office work registered in the list D1 is overwritten and updated by the edit data of the new office work (step S22). As a result, the edit data (In the cache) of the old office work registered in the list D1 is not destaged, and it is possible to reduce a load of the destage processing.

(C) Effects

As described above, according to the storage apparatus 1 as an example of an embodiment, the cache control unit 213 only updates the reference count in the case where the content data to be written is in the list D2 in the processing of the D-series at the time of writing, and does not particularly perform anything for the list D2. For example, the cache control unit 213 does not intentionally perform update processing of the list D2 such as moving the content to a head of MRU. As a result, the content data is easily evicted from t list D2 and easily destaged. In this manner, the cache control unit 213 preferentially destages the content data of the list D2, for example, the content data whose reference count is equal to or larger than 2.

As a result, for example, when the OS and the antivirus software are updated during the office work over the VDI and the write accompanying the update processing occurs in a burst manner, it is possible to preferentially destage the write data accompanying the update processing.

On the other hand, the content data having the reference count of 1 remains in the cache, and the content data of the office work is actively maintained in the list D1. As a result, since the content data to be edited by the office work remains in the cache, the content data over the cache is updated by editing the content data, and the content data is hardly destaged. For example, it is possible to reduce a communication load for disk I/O by reducing the number of times of destaging. When the storage device is, for example, an SSD, it is possible to extend the life of the storage device.

(D) Others

The disclosed technique is not limited to the above-described embodiment but may be carried out with various modifications without departing from the gist of the present embodiment. Each configuration and each process of the present embodiment may be selected or omitted as appropriate, or may be appropriately combined.

In the above-described embodiment, the cache control in the memory 12 provided in the storage apparatus 1 has been described, but the present embodiment is not limited thereto. For example, the present embodiment may be applied to cache control of a memory provided in a computer system, and may be carried out by making various modifications.

In the above-described embodiment, the cache control unit 213 calculates a SHA-1 value of content data (data block) and uses the SHA-1 value as a fingerprint. A value other than the SHA-1 value may be used as the fingerprint.

The present embodiment may be implemented and manufactured by those skilled in the art based on the above disclosure.

(E) Appendices

Regarding the above embodiment, the following appendices are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
  increment, as a number of times of reference, a number of times to which a new data block is referenced while a number of times of reference of an old data block is decremented;
  store, among data blocks stored in a cache area of the memory, an entry of a data block in which writing is requested and the number of times of reference of the data block is 1 in a first management list by a least recently used (LRU) scheme;
  move, when writing is requested for the entry of the data block stored in the first management list and the number of times of reference of the data block becomes equal to or larger than 2, the entry of the data block to a head in a second management list by the LRU scheme;
  move, when the number of times of reference of the data block stored in the second management list becomes 1 by a decrementing process, the entry of the data block to the first management list;
  delete, when the number of times of reference of the data block stored in the first management list becomes 0 by the decrementing process, the entry of the data block from the first management list;
  in a case where an entry of a data block to be written is registered in the first management list when a write request is processed, maintain the entry of the data block registered in the first management list over the cache area; and
  in a case where the entry of the data block to be written is registered in the second management list when the write request is processed, changing the second management list for processing of the write request in terms of the entry of the data block registered in the second management list is not performed.

2. A non-transitory computer-readable storage medium having stored therein a cache control program, in an information processing device that includes a processor and a memory, for causing the processor to execute a process, the process comprising:

incrementing, as a number of times of reference, a number of times to which a new data block is referenced while a number of times of reference of an old data block is decremented;

storing, among data blocks stored in a cache area of the memory, an entry of a data block in which writing is requested and the number of times of reference of the data block is 1 in a first management list by a least recently used (LRU) scheme;

moving, when writing is requested for the entry of the data block stored in the first management list and the number of times of reference of the data block becomes equal to or larger than 2, the entry of the data block to a head in a second management list by the LRU scheme;

moving, when the number of times of reference of the data block stored in the second management list becomes 1 by a decrementing process, the entry of the data block to the first management list;

deleting, when the number of times of reference of the data block stored in the first management list becomes 0 by the decrementing process, the entry of the data block from the first management list;

in a case where an entry of a data block to be written is registered in the first management list when a write request is processed, maintaining the entry of the data block registered in the first management list over the cache area; and in a case where the entry of the data block to be written is registered in the second management list when the write request is processed, not performing changing the second management list for processing of the write request in terms of the entry of the data block registered in the second management list.

\* \* \* \* \*